United States Patent Office.

ARNOLD STEINER, OF BASLE, SWITZERLAND, ASSIGNOR TO CHEMICAL WORKS, FORMERLY SANDOZ, OF SAME PLACE.

BLUE DYE FROM GALLOCYANIN.

SPECIFICATION forming part of Letters Patent No. 643,338, dated February 13, 1900.

Application filed December 19, 1899. Serial No. 740,914. (No specimens.)

*To all whom it may concern:*

Be it known that I, ARNOLD STEINER, doctor of philosophy, a citizen of the Swiss Republic, residing at Basle, Switzerland, have invented new and useful Improvements in the Manufacture of a Blue Dye Derived from Gallocyanin, (for which patent has been applied in France, Serial No. 282,968, dated November 30, 1899,) of which the following is a specification.

The present invention relates to the manufacture of new most valuable blue dyestuffs by substituting a hydrogen atom in one of the hydroxylic groups of the gallocyanin or its derivatives by an acid radical, especially an alphylsulfon radical $XSO_2$, whereby X stands for a benzene, toluene, or xylene group. This esterification can be performed in a general manner by treating the gallocyanin or its derivatives in alkaline solution with aromatical sulfochlorids, (alphylsulfochlorids.) The new dyestuffs thus obtained differ from the gallocyanin by the characteristic property to dye wool in an acid-bath in bright-blue shades fast to milling and light. In accordance with the reactions shown by the oxazins they furnish by reduction leuco derivatives, regenerating in alkaline solution by oxidation with the air easily the original dyestuff.

By treating the new coloring-matters at ordinary temperature with anilin well-characterized anilido compounds are formed. By the action of phenols or phenolsulfonic acid new leuco derivatives are obtained, being themselves very valuable intermediate products for the preparation of new dyestuffs.

In carrying out my invention practically I can proceed as follows: Ten parts, by weight, of the dry hydrochloric-acid salt of gallocyanin are introduced in a solution of ten parts, by weight, of solvay soda in one hundred and fifty parts, by weight, of water and stirred well during an hour until a homogeneous green paste of the gallocyanin soda salt is formed. The mixture is now heated slowly to 70° centigrade, and 5.5 parts, by weight, of benzenesulfochlorid are gradually introduced during six hours, stirring being continued all the time, while the temperature is regulated between 70° and 80° centigrade. As soon as the characteristic smell of the benzenesulfochlorid can no longer be observed the blue solution is filtered. On addition of common salt the new dyestuff separates in green crystals, easily soluble with pure-blue color in water, being precipitated therefrom by an excess of hydrochloric acid in form of the insoluble hydrochloric-acid salt. The watery solution is not altered on addition of caustic alkalies in the cold, while on heating it assumes a dull-green color. The dyestuff is insoluble in benzene. It dissolves in strong sulfuric acid with violet-blue color, which on dilution with water turns into blue red. The solution in spirit shows a very characteristic red fluorescence.

The coloring-matter dyes wool in an acid-bath pure-blue shades. Dyed on chrome-mordants or printed together with chromium salts beautiful blue shades are obtained, fast to light and milling.

In the foregoing example the benzenesulfochlorid may be substituted by other alphylsulfochlorids as the toluenesulfochlorids or the xylenesulfochlorids, whereby coloring-matters with quite analogous properties are obtained.

Now what I claim, and desire to secure by Letters Patent, is the following:

The blue coloring-matter obtained by esterification of a hydroxylic group in the gallocyanin by an alphylsulfon radical, which dye represents a green crystalline powder, easily soluble in water with pure-blue color, insoluble in benzene, dissolving in strong sulfuric acid with violet-blue color, which on addition of water turns into blue red, its solution in spirit showing a characteristic red fluorescence, dyeing wool from an acid-bath and also wool and cotton mordanted with chromium salts in beautiful blue shades fast to light and milling.

In testimony whereof I have signed my name to this specification in the presence of two subscribing witnesses.

ARNOLD STEINER.

Witnesses:
 GEORGE GIFFORD,
 MELCHIOR BONIGER.